United States Patent [19]

Kacal

[11] 4,262,691
[45] Apr. 21, 1981

[54] CAM MEANS FOR BALL VALVE SEAT RINGS

[75] Inventor: Gary W. Kacal, East Bernard, Tex.

[73] Assignee: ACF Industries, Incorporated, New York, N.Y.

[21] Appl. No.: 53,593

[22] Filed: Jun. 29, 1979

[51] Int. Cl.³ .................... F16K 43/00; F16K 25/00
[52] U.S. Cl. .................................. 137/315; 251/174; 251/287; 251/315; 251/316
[58] Field of Search ............... 137/315, 316; 251/159, 251/174, 286, 287, 315

[56] References Cited

U.S. PATENT DOCUMENTS

| | | | |
|---|---|---|---|
| 1,293,753 | 2/1919 | Gibson | 251/286 |
| 2,030,150 | 2/1936 | Mueller | 251/286 |
| 2,086,001 | 7/1937 | Shaw | 251/286 |
| 3,114,386 | 12/1963 | Dumm | 137/316 |
| 3,171,429 | 3/1965 | Stümer | 137/315 |
| 3,269,691 | 8/1966 | Meima et al. | 251/174 |
| 3,771,545 | 11/1973 | Allen | 137/315 |
| 4,151,855 | 5/1979 | Levin et al. | 137/315 |
| 4,175,577 | 11/1979 | Kacal et al. | 137/315 |

FOREIGN PATENT DOCUMENTS 1215159  12/1970  United Kingdom ............... 137/316

Primary Examiner—Martin P. Schwadron
Assistant Examiner—G. L. Walton
Attorney, Agent, or Firm—Eugene N. Riddle; Stephen T. Belsheim

[57] ABSTRACT

A ball valve in which cams (82, 84) are mounted on the ball member (34) to engage spring biased seat rings (30, 32) and cam the seat rings to a retracted position at which the seat rings are retained. The ball valve has a removable cover plate (16) so that the ball member (34) and seat rings may be subsequently removed from the valve body (12) while the valve remains in-line. A removable stop (56) engages and blocks rotation of the ball member past its fully opened and fully closed positions and the cams (82, 84) engage the seat rings only after the stop is removed and the ball member is rotated past its normal stroke and beyond fully opened or fully closed positions.

8 Claims, 6 Drawing Figures

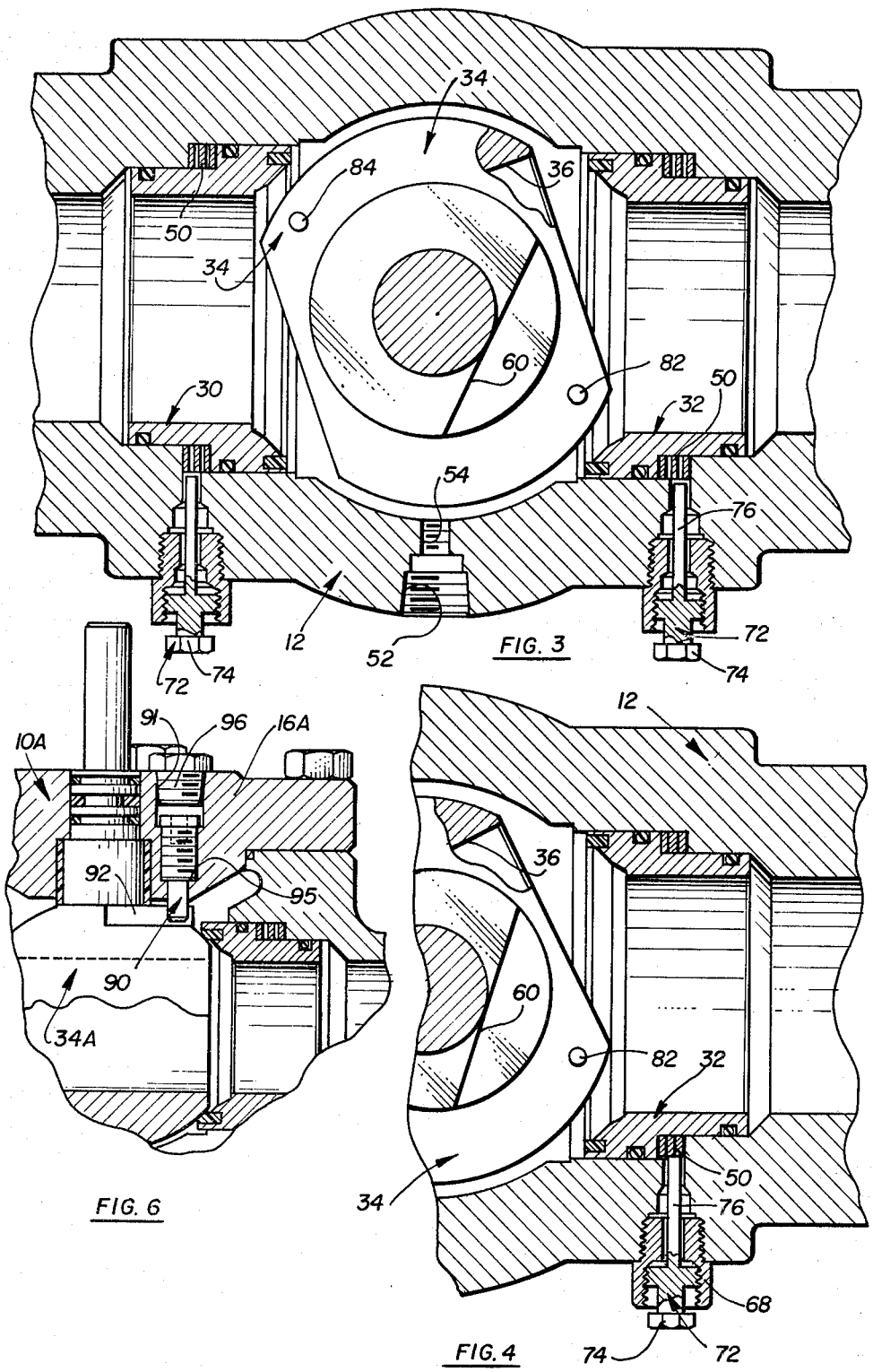

CAM MEANS FOR BALL VALVE SEAT RINGS

BACKGROUND OF THE INVENTION

So-called top entry ball valves utilize an upper cover plate which is removably secured to the valve body and upon removal permits access to the valve chamber for removal of the ball member from the valve chamber. Opposed seat rings are normally spring urged into sealing engagement with the adjacent surface of the ball member and have to be retracted in order to permit removal of the ball member and subsequent removal of the seat rings for repair or replacement. The seat rings heretofore have been retracted by various means, such as separate tools to cam the rings rearwardly. When the ball valve is positioned in a flowline, the separate tool has been inserted in the valve chamber after removal of the cover plate. However, if the ball valve has first been removed from the flowline, a separate tool may be inserted within the flow passage from an end of the valve and the seat rings are then gripped for retraction.

Copending application Ser. No. 902,324 filed May 3, 1978, now U.S. Pat. No. 4,175,577, discloses a means and method for the in-line removal of seat rings in so-called top entry ball valves which includes a separate cam tool inserted between the ball and the seat rings after removal of the cover plate. Thus, a separate cam tool is required to be inserted manually for effecting camming of the seat rings away from the ball member.

Other prior art ball valve arrangements have provided cams on the ball member itself to urge seat rings from the ball member upon rotation of the ball member between opened and closed positions. However, most of these prior art ball valves effect a rearward movement of the seat rings upon every rotation of the ball valve between opened and closed positions which results in a wear of the seat rings and the springs urging the seat rings into engagement with the ball member. A relatively high operating torque may be necessary upon rotation of the valve member between opened and closed positions as a relatively long travel is required for floating seat rings in a top entry ball valve to permit the seat rings to retract a sufficient distance for removal of the ball member. With long travel seat rings relatively high spring forces are required in order to provide an adequate spring force for the seat rings when in sealing engagement with the ball member.

U.S. Pat. No. 3,171,429 dated Mar. 2, 1965 shows a ball valve in which cams are positioned on the ball member to engage bushings or carriers for the seat rings so that a uniform sealing pressure is provided. However, the ball member shown in U.S. Pat. No. 3,171,429 requires a complete rotation about its axis in order to cam the opposed bushings outwardly and two separate cams in sequence engage each bushing in sequence upon a complete revolution of the ball member without any means to selectively block the rotational movement of the ball member.

SUMMARY OF THE INVENTION

This invention is directed primarily to a top entry ball valve having cams on the ball member which engage the opposed seat rings simultaneously to cam the seat rings rearwardly when the cams are operable. A stop pin limits the normal rotation of the ball member between opened and closed positions to a rotational travel stroke of around ninety degrees (90°) and the cams are inoperable during normal travel of the ball member. Upon removal of the stop pin from the travel path of the ball member, the ball member rotates past its normal rotational stroke or travel and the cams are then rendered operable to engage the opposed seat rings and cam the seat rings to a retracted position. Separate retainers are actuated to hold the seat rings in a retracted position. A cover plate is removably attached to the valve body and upon removal permits the ball member to be removed from the body. Thus, the ball member and seat rings can be removed from the valve body to permit repair or replacement of the seat rings.

DESCRIPTION OF THE INVENTION

FIG. 3 is a sectional view similar to FIG. 2 but showing the stop removed and the cams on the ball member in initial engagement with the seat rings;

FIG. 4 is a fragmentary sectional view similar to FIG. 3 but showing the ball member with the cams thereon after the seat rings have been cammed to full retracted position;

FIG. 6 is a section of a separate embodiment of the invention showing the stop carried by the cover plate and being removed upon removal of the cover plate from the valve body.

Figure 1:
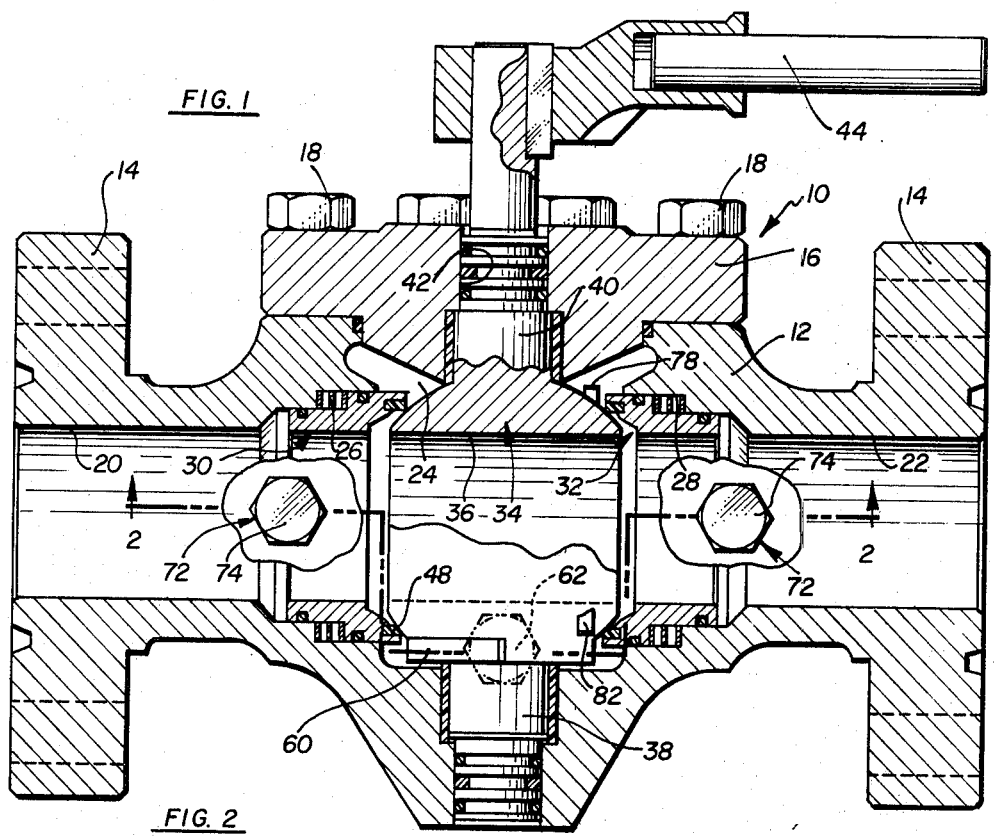
FIG. 1 is a longitudinal section of a ball valve of the top entry type having spring loaded seat rings.

Referring now to the drawings, the ball valve structure indicated generally at 10 includes a valve body 12 having end flanges 14 which are adapted to be bolted to a flowline in which ball valve 10 is positioned. An upper cover plate 16 is bolted by studs 18 to body 12. An inlet flow passage is indicated at 20 and an outlet flow passage is indicated at 22 with the valve chamber 24 positioned between and communicating with flow passages 20 and 22. A stepped upstream recess forming an upstream seat pocket is shown at 26 about inlet flow passage 20 and a downstream recess 28 forming a downstream seat pocket is shown about outlet flow passage 22. An upstream seat assembly is indicated generally at 30 and a downstream seat assembly is indicated generally at 32. A ball member is indicated generally at 34 and has a central bore 36 therethrough. A lower stem 38 on ball member 34 is mounted in a suitable bore in body 12. Upper stem 40 extends through opening 42 in cover plate 16 and a suitable handle 44 is secured to the upper end of stem 40 for movement of ball member 34 between open and closed positions relative to flow passages 20 and 22.

Upstream and downstream seat assemblies 30, 32 are identical. Each includes O-rings 46 fitting in annular grooves about the outer periphery of the associated seat assembly which are adapted to seal against valve body 12. A face seal 48 is adapted to engage the sealing face of valve member 34 for sealing thereagainst. A plurality of wave springs shown at 50 fit in a pocket between each seat assembly 30, 32 and the adjacent body 12 to urge continually the associated seat assembly into sealing engagement with ball 34. It is noted that seat assemblies 30, 32 have a relatively long travel since the seat assemblies must retract a sufficient amount to permit ball member 34 to be removed from body 12. Thus, wave springs 50 are adequate to provide a sufficient sealing force at the full extended position of seat assemblies 30, 32 and yet permit sufficient rearward travel for the removal of ball member 34.

Figure 2:
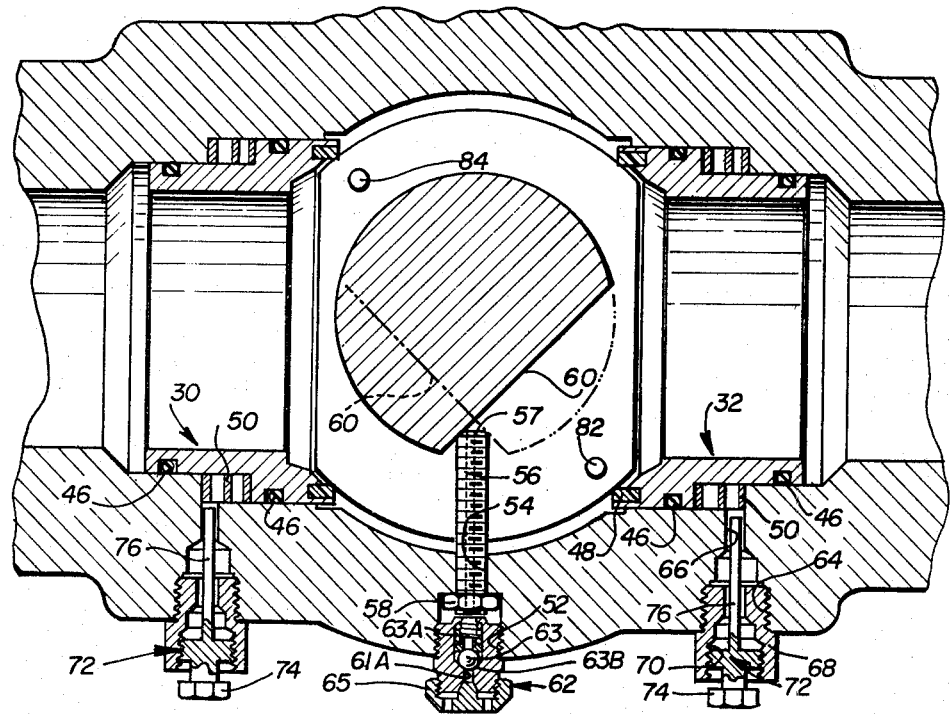
FIG. 2 is a section taken generally along line 2—2 of FIG. 1 and showing the removable stop for the ball member, the ball member being shown in an open position in solid lines.
Figure 5:
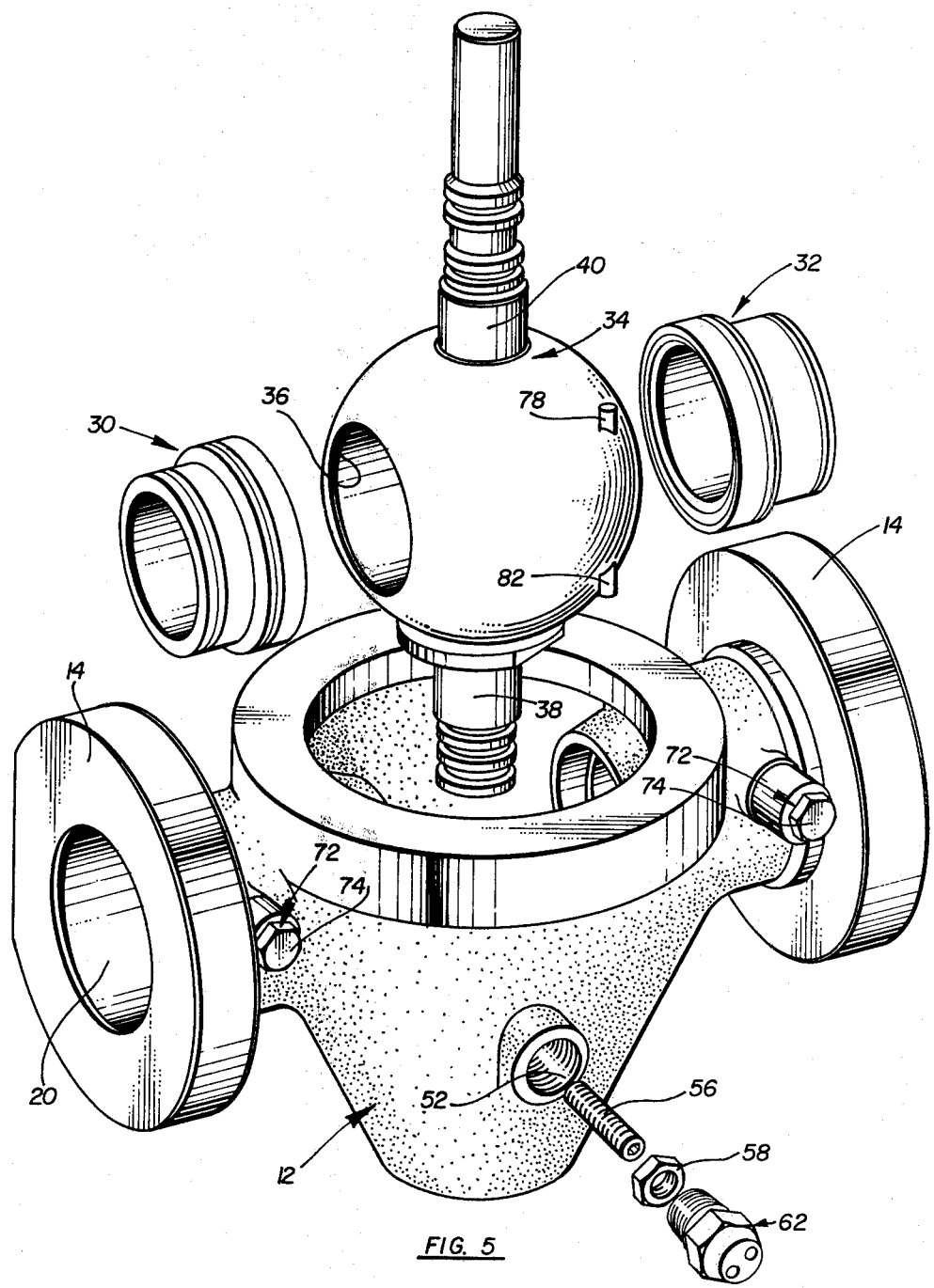
FIG. 5 is an exploded view of the ball valve shown in FIGS. 1-4 with the ball member and seats removed from the valve body.

An opening extending through valve body 12 as shown particularly in FIGS. 2 and 3 includes an internally threaded enlarged diameter bore portion 52 and an internally threaded small diameter bore portion 54. An externally threaded Allen head screw indicated generally at 56 is threaded within bore portion 54 and has an inner tapered end 57 which may be adjusted within bore portion 54. Screw 56 has a central bore 59 extending therethroughwhich permits the drainage of water or other liquids from body 12. A suitable lock nut 58 is threaded onto screw 56 to limit the movement of screw 56. Ball member 34 has a flat portion 60 thereon as shown in FIG. 2 and tapered end 57 of screw 56 contacts one end of elongated flat portion 60 at the fully open position of valve member 34 shown in solid lines in FIG. 2. Stop pin or screw 56 engages the opposite end of flat portion 60 to stop the rotation of valve member 34 at the fully closed position thereof as shown in broken lines in FIG. 2. Thus, ball member 34 has a normal rotational travel of around ninety degrees (90°) from the fully open position of FIG. 2 to the fully closed position of FIG. 2 thereby to limit the stroke or normal travel of ball member 34 to an amount around ninety degrees (90°). An externally threaded lubricating plug generally indicated 62 is threaded within the internally threaded enlarged diameter bore portion 52. Lubricating plug 62 is of a type well known in the art including a main body 61 having a central bore 61A therethrough with a ball valve element 63 urged by spring 63A toward a seated position on seat 63B for closing the central bore. An outer cap 65 is threaded onto the end of body 61 to permit access to bore 61A. To drain body 12, plug 62 is removed to permit the drainage of fluids through bore 59 of screw or stop pin 56.

When seat assemblies 30 and 32 are moved to the full retracted position, it may be desirable to retain seat assemblies 30 and 32 in the fully retracted position to permit the removal of ball member 34 upon removal of cover plate 16 from body 12. For this purpose, a grease fitting opening is utilized to receive a retainer for each seat assembly 30, 32. The opening comprises a large diameter internally threaded portion 64 and a small diameter connecting portion 66 adjacent wave springs 50. An externally threaded outer housing 68 is threaded within portion 64 and has an internally threaded central bore 70. A plunger generally indicated at 72 has a head 74 which may be engaged by a wrench or the like for rotation of plunger 72. An elongated integral pin 76 extends from plunger 72 and fits within small diameter portion 66 adjacent wave springs 50. Upon rotation of head 74 by a suitable wrench or the like, the inner end of pin 76 engages wave springs 50 to compress springs 50 against the adjacent outer circumferential surface of the associated seat assembly to hold the seat assembly in a retracted position. Wave springs 50 are made inoperable when engaged by pin 76 in a tight frictional relation. Plunger 72 may be unthreaded for the release of the seat assembly when desired.

Ball member 34 has a pair of opposed upper cams 78, 80 secured to the ball member and a pair of lower cams 82, 84 arranged in opposed relation. Cams 78 and 82 are adapted to engage seat assembly 32 and cams 80 and 84 are adapted to contact seat assembly 30. Each cam is press fitted or driven within a short bore opening in ball member 34 and extends outwardly from the spherical sealing face of ball member 34 with the extending end of the pin forming the cam portion which engages the associated seat assembly. Cams 78, 80, 82, and 84 do not engage seat assemblies 30 and 32 during the normal rotation or travel of ball valve member 34 between open and closed positions as stop pin 56 engages flat 60 to hold the cams out of engagement with seat assemblies 30, 32 thereby to render the cams inoperable during the normal travel or stroke of the valve member 34. The cams become operable when stop pin 56 is withdrawn from the path of travel of valve member 34 and valve member 34 is rotated past the fully open position as shown in FIGS. 3 and 4. Valve member 34 is shown in FIG. 3 when the cams initially engage seat assemblies 30 and 32. FIG. 4 shows seat assembly 32 after it has been moved or cammed by cams 82, 84 to full retracted position and plunger 72 has been actuated so that the end of pin 76 engages wave springs 50 to urge wave springs 50 into tight frictional engagement with the outer peripheral surface of seat assembly 32. Although not shown in FIG. 4, seat assembly 30 is simultaneously retracted by cams 80, 84. In this position, ball member 34 may be removed. Then plungers 72 are withdrawn to release seat assemblies 30 and 32 for subsequent removal from valve body 12.

Referring to FIG. 6, a separate embodiment of the present invention is illustrated in which ball valve 10A has a valve member 34A and a cover plate 16A. Cover plate 16A has a stop pin 90 received within opening 91 which engages an adjacent flat 92 on the upper portion of ball member 34A and operates in a manner similar to stop pin 56. Stop pin 90 includes an enlarged diameter portion which bottoms on an annular shoulder 95 of cover plate 16A to limit the inward projection of pin 90. A plug 96 is threaded within the opening 91 in cover plate 16A which receives pin 56. Upon removal of cover plate 16A, stop pin 56A is removed automatically.

Under some conditions, it may be desirable to have the cover plate remain in place so that a power driven operator or the like may be employed to rotate the ball member for moving the seat assemblies to a fully retracted position. This may be particularly desirable when relatively large diameter ball members are utilized, such as six inches in diameter or more. The present invention permits the use of such an operator to move the seat assemblies to a retracted position where the seat assemblies are retained in such retracted position. Then the cover plate may be removed for removal of the ball member and then subsequent removal of the seat assemblies.

What is claimed is:

1. A ball valve having a valve body with inlet and outlet flow passages and a valve chamber between the flow passages, a ball member mounted in said valve chamber for rotation between open and closed positions relative to the flow passages and having a bore therethrough;

a seat ring mounted in said body adjacent the ball member for floating longitudinal movement and being biased into sealing engagement with the ball member;

a movable ball member stop carried by the valve body for movement between a first operating position in which said stop extends within the normal travel path of the ball member to limit normal rotation of the ball member between open and closed positions to an amount not substantially greater than around ninety degress (90°), and a second operating position in which said stop is removed from the normal travel path of the ball member to allow complete rotation of the ball member; and a cam member carried by the ball member to engage the seat ring only when the ball member is rotated beyond the travel path normally followed when the ball member is rotated between open and closed positions, said cam member upon the movement of said stop to the second position and upon rotation of the ball member past its normal travel path engaging the seat ring to cam the seat ring away from the ball member.

2. The ball valve as set forth in claim 1 wherein means releasably holds the seat ring in a retracted position after the seat ring has been cammed to retracted position to permit removal of the ball member and then subsequent removal of the seat ring.

3. A ball valve having a valve body with inlet and outlet flow passages and a valve chamber between the flow passages, a ball member mounted in said valve chamber for rotation between open and closed positions relative to the flow passages and having a bore therethrough;
    a pair of opposed seat rings mounted in said body about said flow passages for floating longitudinal movement toward and away from the ball member and being biased into sealing engagement with the ball member on opposite sides thereof;
    a removable ball member stop carried by the valve body for movement between a first operating position in which said stop extends within the valve chamber to contact and block rotation of the ball member past a maximum rotational travel of not substantially greater than around ninety degrees (90°), and a second operating position in which said stop is removed from the normal travel path of the ball member to allow complete rotation of the ball member;
    a pair of oppositely disposed cam members carried by the ball member to simultaneously engage the seat rings only when the ball member is rotated beyond the travel path normally followed when the ball member is rotated between open and closed positions;
    said cam members upon the movement of said stop to the second position and rotation of the ball member past its normal travel path engaging the seat rings simultaneously to cam the seat rings away from the ball member.

4. The ball valve as set forth in claim 3 wherein means releasably hold the seat rings in a retracted position after the seat rings have been cammed to retracted position to permit removal of the ball member and then subsequent removal of the seat rings.

5. The ball valve as set forth in claim 3 wherein said ball member stop comprises a stop pin extending through the valve body into the valve chamber, said stop pin being threaded within the valve body and being longitudinally adjustable relative to the valve body and the ball member.

6. In a ball valve having a valve body with inlet and outlet flow passages and a valve chamber between the flow passages, a ball member mounted in said valve chamber for rotation between open and closed positions relative to the flow passages and having a bore therethrough, a cover plate removably connected to the valve body to permit removal of the ball member from the body when the plate is removed from the body, and a pair of opposed seat rings mounted in said body about said flow passages for floating back and forth longitudinal movement relative to the ball member and being biased into sealing engagement with the ball member, an improved means to permit in-line removal of the seat ring comprising:
    a removable ball member stop carried by the valve body and movable between a first operable position in which the ball member stop limits the normal rotational stroke of the ball member fully opened and closed positions to a maximum not substantially greater than around ninety degrees (90°), and a second operable position in which the ball member stop allows the ball member to freely rotate three hundred sixty degrees (360°);
    a pair of cam members carried by the ball member to engage the seat rings when the ball member is rotated beyond its normal rotational stroke, said cam member upon the movement of said stop of the second position and upon rotation of the ball member past its normal rotational stroke engaging the seat rings simultaneously to cam the seat rings to a fully retracted position away from the ball member upon the rotation of the ball member approximately ninety degrees (90°) past its fully open or fully closed positions; and
    means to releasably hold the seat rings in said fully retracted position to permit a removal of the ball member.

7. In a ball valve as set forth in claim 6 wherein said ball member stop comprises a stop pin extending through the valve body into the valve chamber, said stop pin being threaded within the valve body and being longitudinally adjustable relative to the valve body and the ball member.

8. In a ball valve as set forth in claim 6 wherein said ball member stop is carried by said cover plate and is removed from contact with the ball member upon removal of the cover plate from the valve body.

* * * * *